Dec. 10, 1963   EIJI FUKITA ETAL   3,113,851
PROCESS FOR RECOVERING VAPORS
Filed Sept. 6, 1960
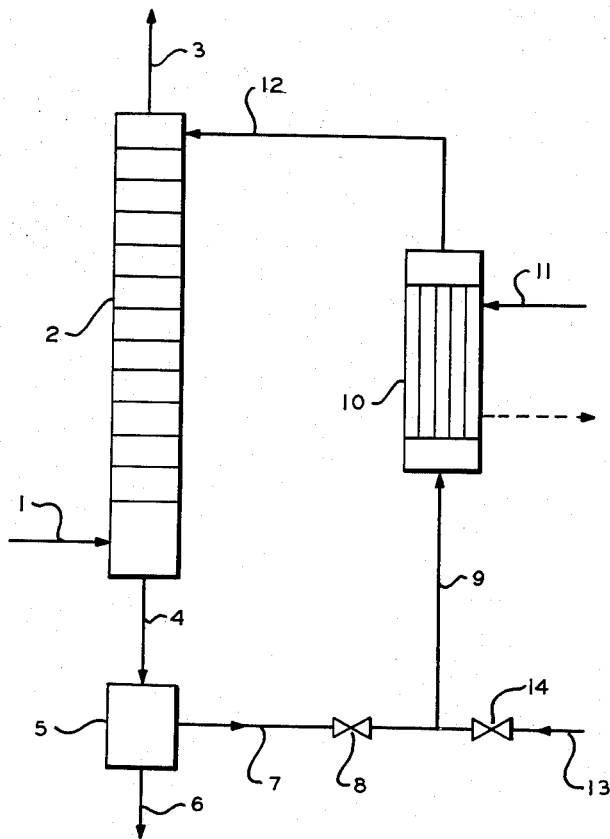
INVENTORS
JUN ADACHI
EIJI FUKITA
TAKEJI TATSUMI
BY *Maynard L. Youngs*
ATTORNEY 3,113,851
PROCESS FOR RECOVERING VAPORS
Eiji Fukita and Takeji Tatsumi, Kurashiki City, and Jun Adachi, Ashiya City, Japan, assignors to Kurashiki Rayon Co., Ltd., Okayama Prefecture, Japan, a corporation of Japan
Filed Sept. 6, 1960, Ser. No. 53,946
Claims priority, application Japan Sept. 5, 1959
4 Claims. (Cl. 55—63)

This invention relates to the vapor-phase synthesis of vinyl acetate and is more particularly concerned with the treatment of the gases issuing for the reaction zone.

Vinyl acetate is produced by the vapor-phase reaction between acetylene and acetic acid, as described, for example, in Freed U.S. Patent 2,411,962.

In such vapor-phase synthesis of vinyl acetate, there is a tendency for the formation of by-product ethylidene diacetate and, in order to minimize such by-product formation, and at the same time to maintain a desired reaction rate, acetylene is used in excess in amounts varying from over twice up to about 5 times the equimolecular quantity with respect to acetic acid. As the result, even after much of the acetic acid has reacted with the acetylene and vinyl acetate has been produced, the amount of acetylene, i.e. the amount of non-condensible gas in the reaction gases issuing from the reaction vessel, is substantial in comparison with the condensible vapors, viz. vapors of unreacted acetic acid, vinyl acetate, and the like, contained in the reaction gases. Usually, the concentration of acetylene in the reaction gases is 60–85% by volume.

Heretofore, it has been common practice to use indirect cooling and condensing apparatus such as tubular or plate heat exchangers, and like devices, for the condensation of the acetic acid and vinyl acetate vapor and other condensible vapors in the reaction gases, by cooling the reaction gases containing the large amount of non-condensible acetylene. Owing to the presence of the large amount of non-condensible acetylene, the heat transfer rate is small, the overall heat transfer coefficient being about 10–50 kcal./m.$^2$hr. °C., and the heat transfer area required is enormous. For this reason, the cost of the cooling and condensing installation required by the conventional recovery method is very high, particularly in view of the fact that the use of corrosion resistant material is necessary.

It is an object of this invention to provide an improved method of treating the reaction gases from vinyl acetate synthesis containing large amounts of non-condensible acetylene.

It is another object of the invention to provide a method of the character indicated which makes possible important savings in equipment and other costs in comparison with conventional methods.

In accordance with the invention, the reaction gases from the synthesis of vinyl acetate in the presence of excess acetylene are cooled and condensed in a cooling zone by direct contact with a cooling medium and, as the cooling medium, there is used the liquid cooled and condensed in cooling zone, i.e., the reaction solution itself, or one or more components of the reaction solution cooled to the desired temperature. According to this invention, when the reaction gases containing a large amount of acetylene are directly contacted with the reaction solution or one or more components of the reaction solution, e.g. vinyl acetate, or a mixture of acetic acid and vinyl acetate, and a cooling zone is employed having contacting surfaces for gas-liquid heat interchange, the reaction gases can be cooled and condensed easily and effectively notwithstanding the presence of the non-condensible acetylene.

Since the reaction solution containing acetic acid, vinyl acetate, and the like contained in the cooling zone is discharged from the bottom of the zone together with the cooling medium at comparatively high temperatures, differing from the situation when, following the conventional practice of indirect cooling and condensation, the amount of acetylene dissolved in the solution at the bottom of the cooling zone is greatly decreased. Consequently, the apparatus for the recovery of the acetylene dissolved in the reaction solution required by the conventional method can be completely eliminated or at most can be of a very small size.

The temperatures of the liquid issuing from the bottom of the tower defining the cooling zone will, of course, depend on the nature of the cooling medium, the flow rates, and the temperatures at which the reaction gases entered the zone. However, the highest temperature is the saturation temperature at the lowest pressure in the tower for the composition of the liquid being discharged from the bottom of the tower. In using the reaction solution, or one or more of the components contained in the reaction solution discharged from the bottom of the cooling zone, as the cooling media, these media must be cooled to a predetermined temperature. In order to effect such cooling of these media, heat exchange with cold water or brine, or like commonly used cooling fluids may be employed. The temperature to which the reaction solution, or one or more components of the reaction solution, is cooled prior to use of such solutions as cooling media, will, of course, vary in dependence upon the composition of the cooling medium. The desired condensation of condensible vapors in the reaction gases from the synthesis zone is such that the non-condensed gas issuing from the cooling zone shall contain substantially no condensible vapor and be suitable for reuse as acetylene feed for recirculation to the reaction zone. Generally, the temperature of the cooling media is in the range of −15 to 10° C.

Cooling towers of known construction can be used for effecting heat exchange by direct contact of the reaction gases with the product cooling media in accordance with this invention. For example, towers filled with packing materials such as Raschig rings, Berl saddles and the like are suitably employed. Similarly, use can also be made of plate columns such as columns containing perforated plates, lens plates, bubble cap plates, and the like.

The invention will now be described by particular reference to a specific example of practical operation, in connection with the accompanying drawing which shows, diagrammatically and schematically, a typical apparatus assembly suitable for carrying out the gas recovery operation of this invention.

Referring to the drawing, the reaction gases with a content of 60 to 85% by volume of acetylene issuing from the vapor-phase reaction vessel for use in the manufacture of vinyl acetate (not shown) are fed to the bottom of the gas cooling tower 2 through the line 1 at a temperature of 50 to 200° C. On the other hand, the cooling medium, i.e., the reaction solution, or one or more components in the reaction solution, is led to the top of the gas cooling tower 2, and flows downwardly in direct counter-current contact with the reaction gases which rise in the tower. Such direct contact cools the reaction gases, thereby condensing the condensible vapors in them, i.e. the vapors of acetic acid, vinyl acetate, and the like. Thus, the gas issuing from the top of the tower containing almost no condensible vapor is composed almost entirely of acetylene gas, and can be directly reused in the vinyl acetate synthesis by recirculating it to the reaction vessel again through the line 3 at the top of the tower 2 at a temperature of −12 to 10° C. The liquid mixture of acetic acid and vinyl acetate, condensed from the reaction gases is passed, together with the cooling medium, from the bottom of the tower 2 through a line 4 to a receiver 5. Part of this mixture is withdrawn as product, the vinyl acetate being recovered from the mixture by conventional means, e.g. by distillation, as described, for example, in Freed 2,411,962. The temperature of the liquid mixture issuing from the bottom of tower 2 is usually 30 to 80° C. The higher this temperature, the better is the result from the standpoint of economy of heat in the subsequent distillation process and from the standpoint of the decrease in the amount of dissolved acetylene in the product solution flowing through line 4. The portion of the product solution to be employed as the cooling medium is drawn from the receiver 5 and is passed through line 7, controlled by valve 8, and through line 9 into cooler 10, wherein the solution is cooled to a temperature of −15 to 10° C. by indirect heat-exchange with cold water, brine, or the like, introduced into the cooler through line 11. The reaction solution thus cooled to the desired temperature in the cooler 10 is then transferred to the gas cooling tower 2 through line 12. When one or more components of the reaction solution, e.g. vinyl acetate or acetic acid, or both, are to be used as the cooling medium, they are fed to the cooler 10 through line 13 controlled by valve 14. In this case, valve 8 is closed and all of the contents of receiver 5 are withdrawn through line 6. However, a mixture of product from line 7 and product components from line 13, can also be employed.

In putting the method of this invention in practice, the liquid having the composition of the reaction solution, or consisting of one or more components of the reaction solution, must first, in starting up operation, be fed to the gas cooling tower 2 through duct 13, valve 14, duct 9, cooler 10, and duct 12. Then, after equilibrium has been established, normal flow of fluid can be initiated, e.g. by closing valve 14 and opening valve 8 so that part of the reaction solution can be forwarded to the gas cooling tower 2 from the receiver 5 through lines 7, 8, and 9, cooler 10, and line 12. Alternatively, one or more components of the reaction solution may continue to be introduced by way of line 13, valve 14, line 9, and cooler 10.

The invention will be further understood from the following specific example of practical application. However, it will be understood that this example is not to be construed as limiting the scope of the present invention in any manner. In the example, all parts are by weight, unless otherwise indicated.

EXAMPLE

Reaction gases containing 72 volume percent of acetylene were fed to the bottom of gas-cooling tower 2, in the form of a perforated plate tower, at 80° C. at the rate of 26.5 Nm.³/hr. The perforated plate tower 2 used was 240 mm. in diameter, 5 meters in height, and contained 18 plates. These reaction gases underwent effective heat exchange by direct counter-current contact within the tower with condensed reaction liquid at −1° C. supplied through line 12 to the top of the tower at the rate of 90 liters/hr. Simultaneously, non-condensible gas at 0° C. and consisting almost entirely of acetylene and nitrogen and containing almost no condensible vapor was withdrawn through line 3 and could be directly re-used in the vinyl acetate synthesis by recirculation to the reaction vessel. At the same time, reaction liquid condensed from the reaction gases fed into tower 2 was discharged through line 4 into receiver 5 from the bottom of the tower at a temperature about 41° C., together with the cooling media. A portion of this reaction liquid discharged from the bottom of the tower, i.e. sufficient to provide a flow of 90 liters/hr. through line 12, was withdrawn through line 7 and fed through line 12 into cooler 10 where it was cooled in cooler 10 from about 41° C. to −1° C. by indirect liquid-liquid heat exchange with brine, which was introduced through line 11. Cooler 10 was in the form of a multi-tubular heat exchanger having a heat-transfer area of 1 m.², as contrasted with a heat-transfer area of 10 m.² found in multi-tubular heat-exchangers used for the conventional indirect cooling and condensation of reaction gases from vinyl acetate synthesis. The remainder of the reaction liquid in receiver 5 was withdrawn for separation of vinyl acetate in conventional manner. The following table sets forth the compositions of the reaction gas stream, the non-condensed gas stream, and the condensed reaction liquid stream as present in the foregoing example; the quantities being expressed as kg. moles/hr.

*Table I*

| | Vinyl-acetate | Acetic acid | Acet-aldehyde | Acety-lene | Nitrogen | Total |
|---|---|---|---|---|---|---|
| Reaction gas stream | 0.069 | 0.145 | 0.006 | 0.864 | 0.106 | 1.190 |
| Non-condensible gas stream | 0.013 | 0.003 | 0.004 | 0.864 | 0.106 | 0.990 |
| Reaction liquid stream | 0.056 | 0.142 | 0.002 | 0 | 0 | 0.20 |

In adopting the method of the present invention for carrying out direct counter-current heat-exchange upon the reaction gases containing a large amount of acetylene with a compatible cooling media, wherein the cooling media which has been heated by such heat exchange is cooled by indirect liquid-liquid heat-exchange using cold water or brine, no other heat exchange is required. Since the overall heat transfer coefficient of this liquid-liquid heat exchanger is usually 100 to 1,000 kcal./m.²hr.° C., an advantage of the present invention solely from the economic point of view is that the installation cost required is only about ¼ of that necessitated in the case of the conventional method for treating reaction gases containing a large amount of acetylene from vinyl acetate synthesis operations.

It will be understood that, unless otherwise indicated, conventional apparatus are suitably employed in carrying out the process of this invention, including conventional contact and heat-exchange units. The conditions and relative relationships set forth above are those preferred in carrying out the process of the invention, but it will be understood that other conditions and relationships may be used within the scope of the invention.

It will also be understood that various changes and modifications may be made in the embodiments described above without departing from the scope of the invention as defined in the appended claims. It is intended, therefore, that all matter contained in the foregoing description and in the drawing shall be interpreted as illustrative only and not as limitative of the invention.

We claim:
1. A method for cooling and condensing the reaction gases containing high concentrations of acetylene in admixture with condensible constituents consisting essentially of vinyl acetate and acetic acid issuing from the vapor-phase synthesis of vinyl acetate, which comprises passing said gases directly from said synthesis into a cooling zone and cooling and condensing the condensible constituents of said gases by direct heat exchange by direct counter-current contact of said gases in said cooling zone with a cooling medium at a temperature of at most 10° C., said cooling medium being a member of the group consisting of the liquids condensed from said reaction gases and at least one component of said condensed liquids.

2. A method for cooling and condensing the reaction gases containing 60 to 85 volume percent of acetylene in admixture with condensible constituents consisting essentially of vinyl acetate and acetic acid issuing from the vapor-phase synthesis of vinyl acetate which comprises passing said gases directly from said synthesis into a cooling zone and cooling and condensing the condensible constituents of said gases by direct heat exchange by direct counter-current contact of said gas in said cooling zone with a cooling medium, said cooling medium being a member of the group consisting of the liquids condensed from said reaction gases and at least one component of said condensed liquids.

3. A method for cooling and condensing the reaction gases containing high concentrations of acetylene in admixture with condensible constituents consisting essentially of vinyl acetate and acetic acid issuing from the vapor-phase synthesis of vinyl acetate which comprises passing said gases directly from said synthesis into a cooling zone and cooling and condensing the condensible constituents of said gases by direct heat exchange by direct counter-current contact of said gas in said cooling zone with a cooling medium, said cooling medium being employed at a temperature of $-15°$ to $10°$ C. and being a member of the group consisting of the liquids condensed from said reaction gases and at least one component of said condensed liquids.

4. A method for cooling and condensing the reaction gases containing 60 to 85 volume percent of acetylene in admixture with condensible constituents consisting essentially of vinyl acetate and acetic acid issuing from the vapor-phase synthesis of vinyl acetate which comprises passing said gases directly from said synthesis into a cooling zone and cooling and condensing the condensible constituents of said gases by direct heat exchange by direct counter-current contact of said gas in said cooling zone with a cooling medium, said cooling medium being employed at a temperature of $-15°$ to $10°$ C. and being a member of the group consisting of the liquids condensed from said reaction gases and at least one component of said condensed liquids.

References Cited in the file of this patent

UNITED STATES PATENTS

| | | |
|---|---|---|
| 1,989,273 | Grimme et al. | Jan. 29, 1935 |
| 2,313,196 | Guinot | Mar. 9, 1943 |
| 2,664,968 | Wood | Jan. 5, 1954 |
| 2,796,448 | Root | June 18, 1957 |
| 2,838,135 | Pilo | June 10, 1958 |